United States Patent [19]

Ohtsu

[11] Patent Number: 5,574,913
[45] Date of Patent: Nov. 12, 1996

[54] CONTROL UNIT FOR A COMPUTER SYSTEM COMPRISING A PLURALITY OF CPU'S HAVING DIFFERENT INSTRUCTION PROPERTIES

[75] Inventor: Toshiyuki Ohtsu, Tokyo, Japan

[73] Assignee: NEC Corporation, Tokyo, Japan

[21] Appl. No.: 253,068

[22] Filed: Jun. 2, 1994

[30] Foreign Application Priority Data

Jun. 4, 1993 [JP] Japan .................................. 5-160121

[51] Int. Cl.⁶ .................................................. G06F 9/00
[52] U.S. Cl. .................. 395/561; 364/281.3; 364/281.4; 364/281; 364/DIG. 1; 364/281.6; 364/281.8; 364/281.9
[58] Field of Search ............................................ 395/650

[56] References Cited

U.S. PATENT DOCUMENTS

| | | | |
|---|---|---|---|
| 5,003,464 | 3/1991 | Ely et al. | 364/200 |
| 5,109,512 | 4/1992 | Bahr et al. | 395/650 |
| 5,115,505 | 5/1992 | Bishop et al. | 395/650 |
| 5,301,104 | 4/1994 | Yalamanchili | 395/800 |
| 5,307,495 | 4/1994 | Seino et al. | 395/650 |
| 5,333,297 | 7/1994 | Lemaire et al. | 395/500 |
| 5,381,534 | 1/1995 | Shi | 395/200 |
| 5,408,658 | 4/1995 | Rechtschaffen et al. | 395/650 |

OTHER PUBLICATIONS

NEC Corporation, "ACOS–4/XVP Supervisor Reference Manuel", *ACOS Software*, DDA82E-2, 1992, pp. 3–33 to 3–50 and 9–7 to 9–12.

Hwang et al. "Computer Architecture and Parallel Processing", McGraw-Hill, 1985, pp. 589 to 613 and 684 to 687.
Alford, Roger C., "Adding the Right Math Co processor", Computer Craft, May 1991, vol. 1, No. 2, pp. 14,18,20,21, 22,24,25.
Reiss, Levi, Joseph Radin, "Unix System Administration Guide", Osborne McGraw-Hill, pp. 426–430,446–456.
Bahr, James, "Architecture, Design, and Performance of Application System/400" IBM Journal of Research and Development Nov. 1992 V36 p. 1001 (14).

*Primary Examiner*—Kevin A. Kriess
*Assistant Examiner*—St. John Courtenay, III
*Attorney, Agent, or Firm*—Young & Thompson

[57] ABSTRACT

CPUs are grouped into a plurality of groups of CPUs. CPUs of a particular group have a similar instruction configuration, but their instruction properties are different. The CPUs of one group may be capable of executing at high speed instructions related to scientific computation processing, whereas the CPUs within another group may be capable of executing at high speed instructions related to character processing. When execution of a program prepared by program preparation unit is requested, a CPU group designation from the user is communicated to a CPU group selection execution unit through a program execution indication unit. In compliance with the CPU designation, the CPU group selection execution unit requests execution of the program to CPU assignment unit of the designated group, and the CPU assignment unit carries out the execution by assigning the requested program to CPUs within its own CPU group. For a program which does not designate a CPU group, the CPU group selection execution unit requests execution by assigning the program to the CPU assignment unit of an arbitrary CPU group.

28 Claims, 9 Drawing Sheets

| PROGRAM NAME | TASK NAME | CPU GROUP INDICATING INFORMATION | CURRENTLY ASSIGNMENT CPU GROUP AND CPU | UTILIZATION TIME | . . . . . |
|---|---|---|---|---|---|
| | ⋮ | | | | |
| | ⋮ | | | | |

FIG. 3

| | | | |
|---|---|---|---|
| CPU GROUP 2 | CPU 9 | STATUS | INFORMATION OF TASKS UNDER EXECUTION |
| | CPU 10 | STATUS | INFORMATION OF TASKS UNDER EXECUTION |
| | CPU 11 | STATUS | INFORMATION OF TASKS UNDER EXECUTION |
| CPU GROUP 3 | CPU 12 | STATUS | INFORMATION OF TASKS UNDER EXECUTION |
| | CPU 13 | STATUS | INFORMATION OF TASKS UNDER EXECUTION |
| | CPU 14 | STATUS | INFORMATION OF TASKS UNDER EXECUTION |

FIG. 4

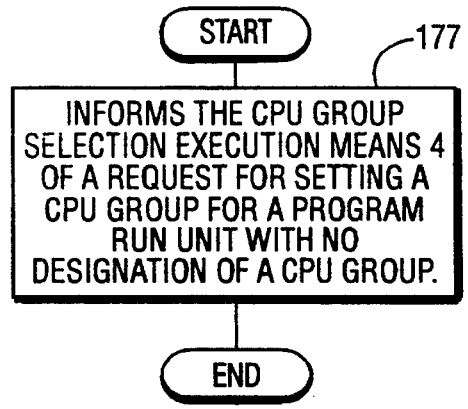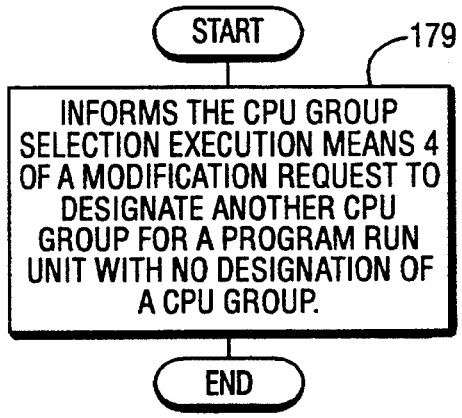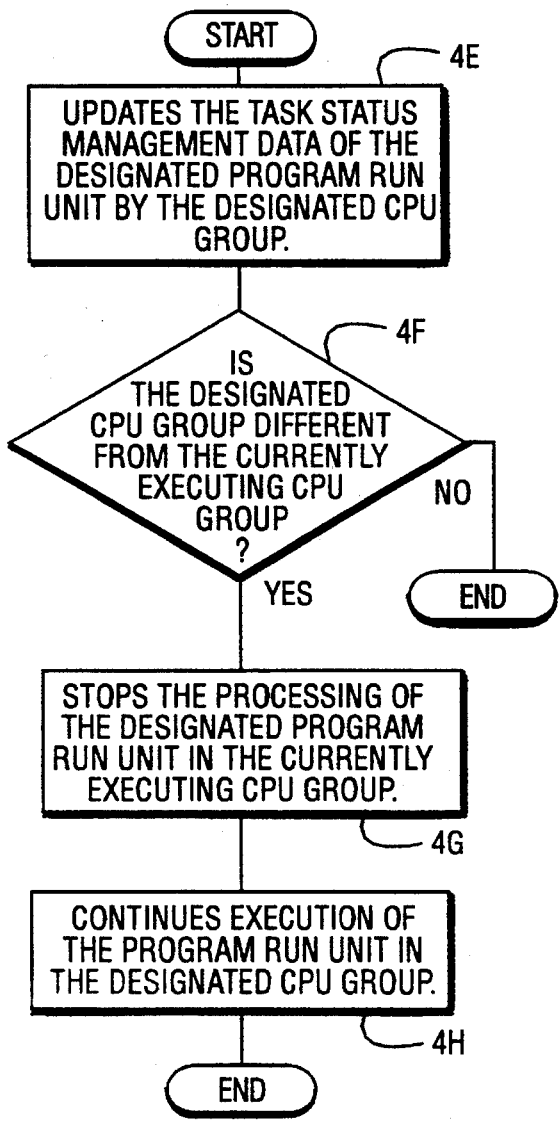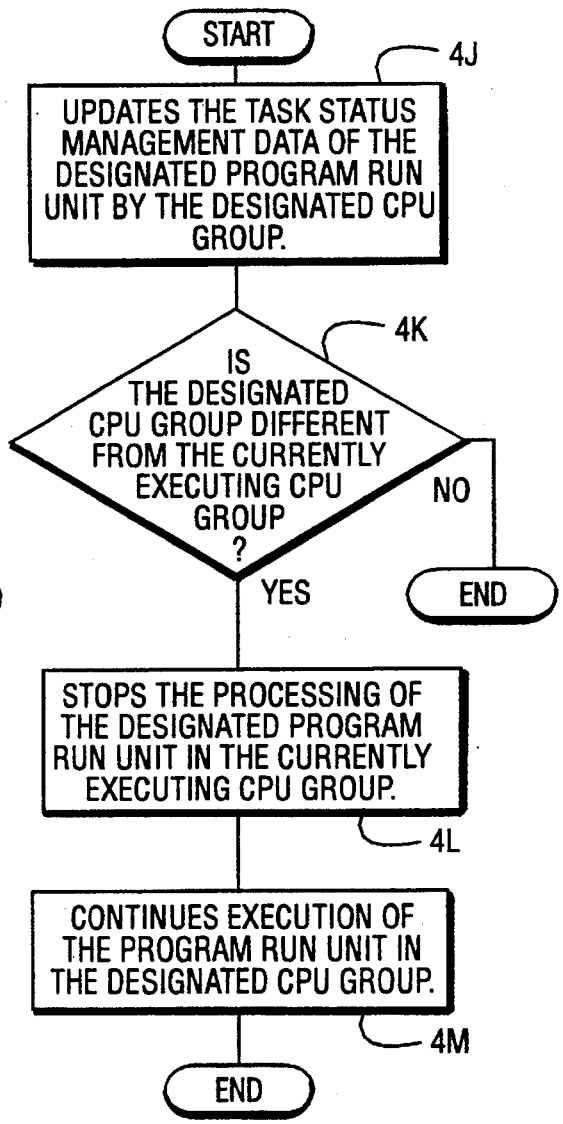
FIG. 8A

CONTROL UNIT FOR A COMPUTER SYSTEM COMPRISING A PLURALITY OF CPU'S HAVING DIFFERENT INSTRUCTION PROPERTIES

BACKGROUND OF THE INVENTION

1. Field of the Invention

The present invention relates to a computer system with a multiprocessor configuration and more particularly to a control unit for a computer system comprising a plurality of CPUs having different instruction properties.

2. Description of Related Art

In a conventional computer system with a multiprocessor configuration, all the CPUs have equivalent functions and properties and these CPUs are utilized without discrimination by an operating system according to the dispatching function, as in the technique disclosed in "ACOS-4/XVP Supervisor Reference Manual", DDA82E-2, NEC Corporation, 1992, pp. 3–33 to 3–34.

Moreover, in the technique disclosed in pp. 9–7 to 9–12 of the above-mentioned "Supervisor Reference Manual", all the CPUs are treated equivalently also in the fault recovery processing of the CPUs.

Furthermore, there exists an asymmetric system mode, as disclosed in Hwang et al., "Computer Architecture Parallel Processing", McGraw-Hill, 1985, pp. 684–692, in which an attached processing unit having a role different from that of the CPUs is utilized as an attached processor.

In the aforementioned conventional computer system consisting of CPUs having an equivalent instruction property, it is not possible to execute at high speed, both of, for example, a program aimed mainly at scientific computations and a program aimed mainly at office processing, which leads to a drawback in that it is necessary to prepare dedicated computer systems for respective programs.

In addition, in the computer system with the attached processor mode, it has a drawback in that it can execute only specific functions and since a program to be executed by means of attached processors is described in an instruction configuration of CPUs suitable for the property concerned, it has a problem in that when an attached processor becomes unusable due to a fault, the program becomes inoperative even if other CPUs are operating normally.

SUMMARY AND OBJECTS OF THE INVENTION

It is accordingly an object of the invention to provide a computer system comprising a plurality of CPUs having different instruction properties, which is capable of executing at high speed different programs of various properties, such as a program aimed mainly at scientific computations and a program aimed mainly at office processing, by using CPUs suitable for execution of the respective programs.

It is another object of the invention to provide a computer system comprising a plurality of CPUs having different instruction properties, which is capable of operating with high efficiency even if different programs of various properties, such as a program aimed mainly at scientific computations and a program aimed mainly at office processing, are described in the same instruction configuration.

It is still another object of the invention to provide a computer system comprising a plurality of CPUs having different instruction properties, which makes it possible to execute programs of different properties, such as a program aimed mainly at scientific computations and a program aimed mainly at office processing, by any one of CPUs.

A first embodiment of the control unit for a computer system composed of a plurality of CPUs having different instruction properties has the following configuration:

CPU assignment means for classifying by instruction property a plurality of CPUs having the same instruction configuration but different instruction properties, for forming a collection of CPUs with a same property into a CPU group and for controlling execution of program run units requested to be executed in a particular CPU group to CPUs within said CPU group;

A CPU group selection execution means for requesting, at the time of program execution, the CPU assignment means to carry out execution of program run units whose execution was requested to be performed by a designated CPU group and for requesting the CPU assignment means to assign arbitrary CPU groups for execution of program run units with no designation of CPU groups; and A program execution indication means for additionally designating particular CPU groups to execute program run units, upon indicating program execution to the CPU group selection execution means.

BRIEF DESCRIPTION OF THE DRAWINGS

This invention will become more apparent when other features, actions and effects of this invention are described in conjunction with the accompanying drawings, wherein:

FIG. 3 is a diagram showing an example of task execution status management data managed by the CPU group selection execution means 4 in an embodiment of the invention;

FIG. 4 is a diagram showing a list of CPU status management data managed by the CPU group selection execution means 4 of an embodiment of the invention;

FIGS. 8A and 8B show flow charts for the processing of the task status monitoring means 17, the CPU group selection execution means 4 and an execution result output means 18 in an embodiment of the invention.

In the drawings, identical reference numerals indicate similar components.

DETAILED DESCRIPTION OF PREFERRED EMBODIMENTS

Figure 1:
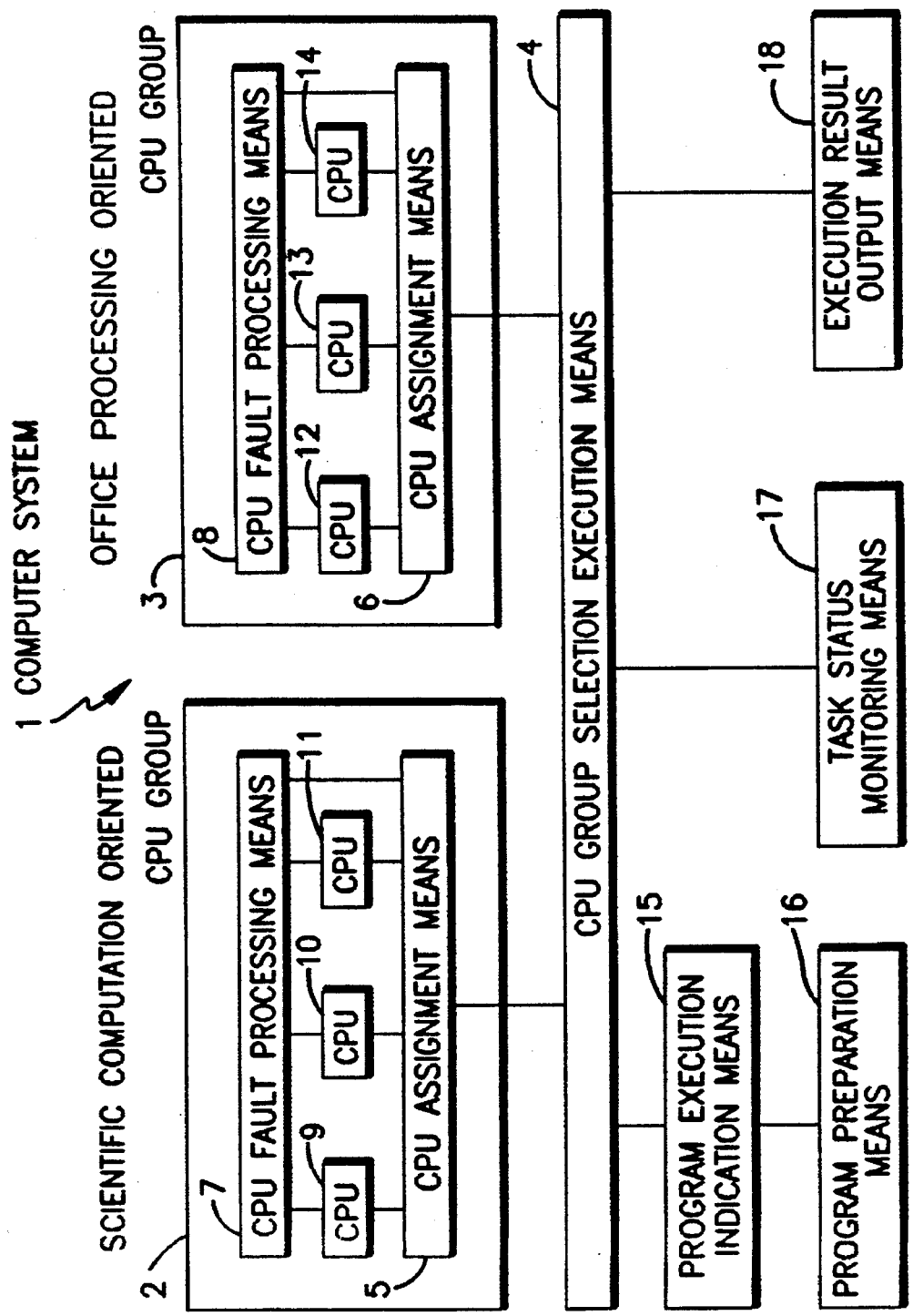
FIG. 1 is a block diagram for an embodiment of the invention.

Next, referring to the drawings, an embodiment of the invention will be described in detail.

Referring to FIG. 1, a computer system 1 according to a first embodiment of the invention is one type of tightly coupled multiprocessor system, and it comprises two CPU groups 2 and 3, CPU group selection execution means 4 connected thereto, program execution indication means 15 connected to the CPU group selection execution means 4, task status monitoring means 17 and execution result output means 18 and program preparation means 16 connected to the program execution indication means 15.

The CPU group 2 is a scientific computation oriented CPU group and consists of three CPUs 9, 10 and 11, CPU fault processing means 7 connected to them, and CPU assignment means 5 connected to the CPUs 9 to 11, the CPU fault processing means 7 and the CPU group selection execution means 4.

The CPU group 3 is an office processing oriented CPU group and consists of three CPUs 12, 13 and 14, CPU fault processing means 8 connected to them, and CPU assignment means 6 connected to the CPUs 12 to 14, CPU fault processing means 8 and CPU group selection execution means 4.

Here, the CPUs 9 to 11 and the CPUs 12 to 14 have the same instruction configuration, but their instruction structures are different. Namely, the CPUs 9 to 11 can execute at high speed arithmetic operation instructions or the like related to scientific computation processing by carrying them out, for example, by hardware dedicated to those purposes, whereas the CPUs 12 to 14 can execute at high speed character processing instructions or the like related to office processing by carrying them out, for example, by hardware dedicated to those purposes.

It should be noted that this embodiment is applicable not only to tightly coupled multiprocessor systems, but also to loosely coupled multiprocessor systems, and the number of CPU groups and the number of CPUs included in each CPU group are needless to say not limited to those in the illustrative examples.

More detailed functions of various parts in the embodiment shown in FIG. 1 will be described in the following discussion of the overall operation of the system.

In FIG. 1, the program preparation means 16 is a means for preparing programs to be executed in the computer system 1 and is composed of, for example, compilers, linkers or the like. A user prepares a program executable in the computer system 1 by utilizing the program preparation means 16 and requests the CPU group selection execution means 4 to execute the program through the program execution indication means 15. Here, the program execution indication means 15 is functional means composed of a JCL or instructions which cause execution of a JCL itself.

In this embodiment, for the program prepared by the program preparation means 16, the user can designate a CPU group which executes the program, in the unit of program or in the unit of task (these will be referred to as program run units herein) if the program has a multi-task structure. When a CPU group is designated for a program to be executed, the program execution indication means 15 designates the CPU group together with the CPU group selection execution means 4 at the time of requesting the means 4 to execute the program. In this embodiment, the designation of the appropriate CPU group can be done selectively according to the following two methods.

(1) Separately designating a CPU group to be used for the execution of the relevant program by the user through the use of the program execution indication means 15 at the time of execution of the program by means of the program execution indication means 15. In this case, the program execution indication means 15 designates the CPU group to the CPU group selection execution means 4 by recognizing the separately indicated CPU group.

(2) Including CPU group designation information in the execution program. Namely, the program preparation means 16 has a function of adding CPU group designation information to every program run unit in a program prepared, and the user can designate a CPU group for each program run unit at the time of program preparation, by utilizing this function. In this case, the program execution indication means 15 designates to the CPU group selection execution means 4 a CPU group, by recognizing CPU group designation information described in an execution program.

It is to be noted that the CPU group need not necessarily be designated and there exists cases where its designation can be omitted.

Now, the CPU group selection execution means 4 which is requested to execute a program from the program execution indication means 15, identifies whether there exists designation of the CPU group for every program run unit (step 41 in FIG. 2), and available CPUs are assigned for program run units with no designation of the CPU group (step 42). The assignment of available CPUs in the processing step 42 is done with all the CPU groups 2 and 3 as the assignment object of execution request, and arbitrary CPU groups are selected among them by considering the balance of loads or the like, and the execution of program run units for which execution was requested is required to the CPU assignment means 5 and 6 of the selected CPU groups.

On the other hand, as regards the program run units to which CPU groups are designated, the CPU group selection execution means 4 judges whether the designated CPU groups are currently available or not (step 43), and if they turn out to be available, requests the CPU assignment means 5 and 6 in the designated CPU groups to execute the program run units for which execution request exists (step 44). When the designated CPU group is not available for such a reason as its being blocked, an available CPU group is assigned in the processing step 42 similar to the case when there is no designation of CPU group, by disregarding designation of the CPU group.

The CPU assignment means 5 and 6 requested by the CPU group selection execution means 4 to execute program run units, select effective (unblocked) CPUs from among CPUs 9 to 11 and CPUs 12 to 14 included in their own groups preferentially, for example, in the order of small load (step 51), and assign program run units requested to be executed to the selected CPUs and cause them to carry out the execution (step 52). In this case, the CPU assignment means 5 and 6 informs the CPU group selection execution means 4 of the manner in which execution was done by assigning which program run unit to which CPU (step 53).

By controlling the system as described in the above, when both CPU groups 2 and 3 are normal without being blocked, the program run units which are requested to be executed one after another by the program execution indication means 15 are executed in CPUs on designated CPU groups for those with CPU group designation and are executed on CPUs of some of the CPU groups for those with no CPU group designation.

Accordingly, if a program run unit in a prepared program is such that it can be executed at higher speed when executed on a scientific computation oriented CPU, execution on one of the CPUs 9 to 11 in the scientific computation oriented CPU group 2 will become available by designating the scientific computation oriented CPU group 2. On the other hand, if a program run unit is such that it can be executed at higher speed when it is executed on an office processing oriented CPU, execution on one of the CPUs 12 to 14 in the office processing oriented CPU group 3 will become available by designating the office processing oriented CPU group 3. In either case, faster program execution becomes feasible.

Moreover, when a program run unit of a prepared program does not match the property of either group 2 or 3, or when execution at high speed is not necessarily required, it is possible to omit the designation of the CPU group to carry out a simple program execution, which makes a special designation unnecessary.

FIG. 3 and FIG. 4 show examples of data managed by the CPU group selection execution means 4, wherein FIG. 3 shows a task execution status management data and FIG. 4 shows a CPU status management data. The task execution status management data in FIG. 3 includes for each program run unit (task) of each program, CPU group designation information, CPU groups and CPUs currently under assignment, utilized CPU group and CPU utilization time on assignment, or the like. Further, the CPU status management data in FIG. 4 includes for each CPU in each CPU group, a state that shows whether the CPU is being blocked and information on tasks under execution such as the names of assigned tasks.

Figure 5A:
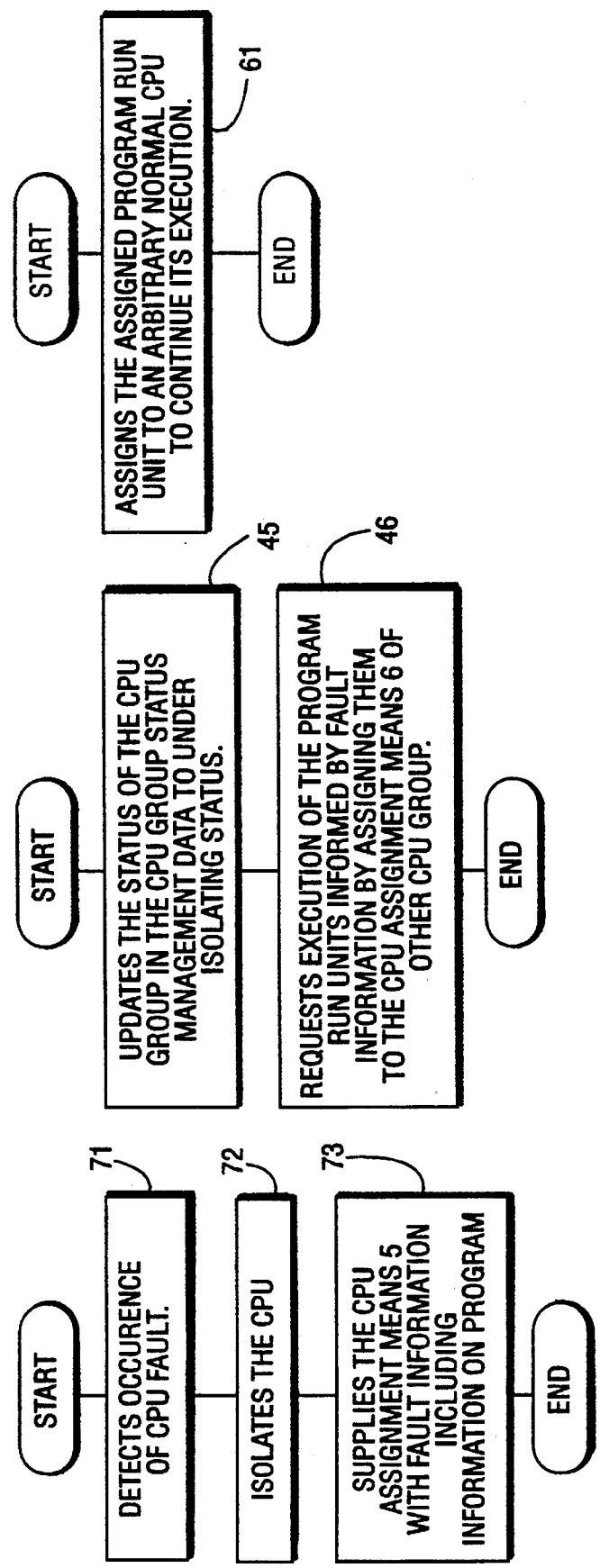
FIGS. 5A and 5B show flow charts for the processing of a CPU fault processing means 7, the CPU assignment means 5, the CPU group selection execution means 4 and a CPU assignment means 6 in an embodiment of the invention.
Figure 5B:
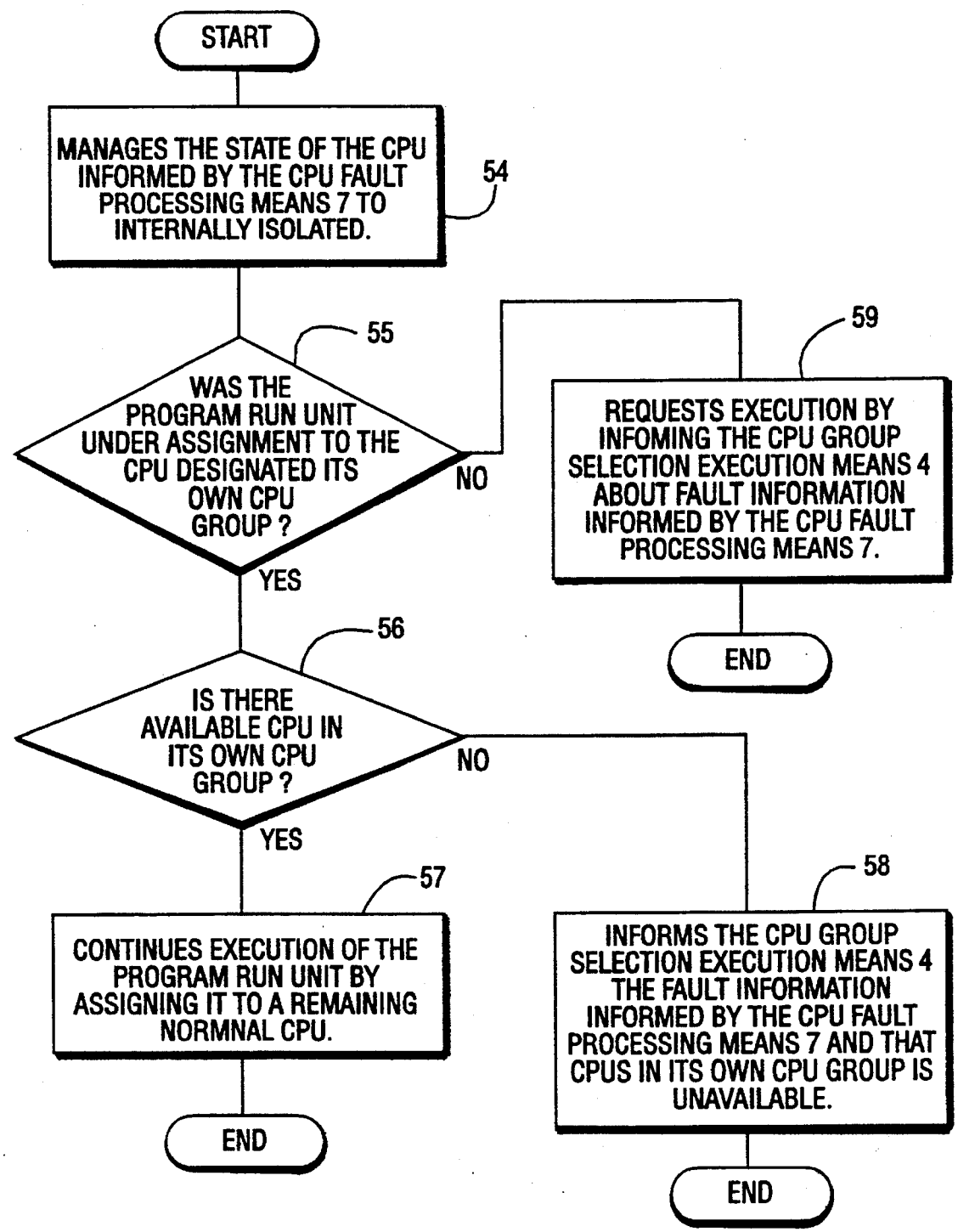

Next, operation of this embodiment during a CPU fault will be described with reference to FIG. 5.

If it is assumed that during execution of a certain program run unit in, for example, CPU 9 of, for example, the scientific computation oriented CPU group 2, operation is interrupted due to a fault such as a failure in CPU 9, then the CPU fault processing means 7 detects the generation of the fault (step 71).

When the CPU fault processing means 7 detects the generation of a fault in CPU 9, it blocks CPU 9 (step 72) and supplies the CPU assignment means 5 with fault information which includes information on the program run unit under execution in CPU 9 (step 73).

The CPU assignment means 5 causes the state of CPU 9 to be internally blocked (step 54) and thereafter excludes CPU 9 from the assignment object of program run units and carries out the following processing in order to transfer to another CPU the program run unit which was under execution in CPU 9.

First, the CPU assignment means 5 confirms whether the program run unit under assignment to CPU 9 designated its own CPU group, namely, the scientific computation oriented CPU group 2 (step 55). If it was a program run unit designating its own CPU group 2, it further confirms whether there exists an available (normal) CPU within its own CPU group (step 56). If there exists an available CPU within its own CPU group 2, it assigns the program run unit concerned to the remaining normal CPU 10 or 11 to continue the execution of the program run unit (step 57).

If in step 56, all CPUs 9 to 11 within its own CPU group are blocked and no available CPU can be found, execution within its own CPU group is unfeasible so that it informs the CPU group selection execution means 4 of the fault information notified by the CPU fault processing means 7 and the fact that all the CPUs within its own CPU group have become unavailable (step 58).

Upon receipt of such a notice, the CPU group selection execution means 4 updates the state of the CPU group 2 in the CPU status management data to that of blockage (step 45) and thereafter excludes the CPU group 2 from the assignment object. The CPU group selection execution means 4 assigns a program run unit under execution in the CPU group 2 as shown in the fault information notified by the CPU assignment means 5 to the CPU assignment means 6 of the CPU group 3, in order to let another CPU group take over the execution by disregarding the designation of the CPU group and requests the execution of the run unit (step 46).

The CPU assignment means 6 assigns the assigned program run unit to an arbitrary normal CPU among CPUs 12 to 14, to continue its execution (step 61). In this way, it becomes possible to continue the execution of a program run unit which designated the scientific computation oriented CPU group without abnormally terminating the execution, though the efficiency is reduced to some extent.

When execution of a new program run unit which designates the CPU group 2 is requested by the program execution indication means 15 after the CPU group 2 was blocked and excluded from the assignment object, the CPU group selection execution means 4 assigns an available CPU in the processing step 42 by disregarding the designation of the CPU group, in a way similar to the case of no designation of CPU group, as described above with reference to FIG. 2.

On the other hand, when a program run unit under execution in CPU 9 was one which did not designate its own CPU group, the CPU assignment means 5 provides the CPU group selection execution means 4 with the fault information supplied by the CPU fault processing means 7 in order to choose an executing CPU without being limited by the framework of the CPU groups and requests its execution (step 59).

Figure 2:
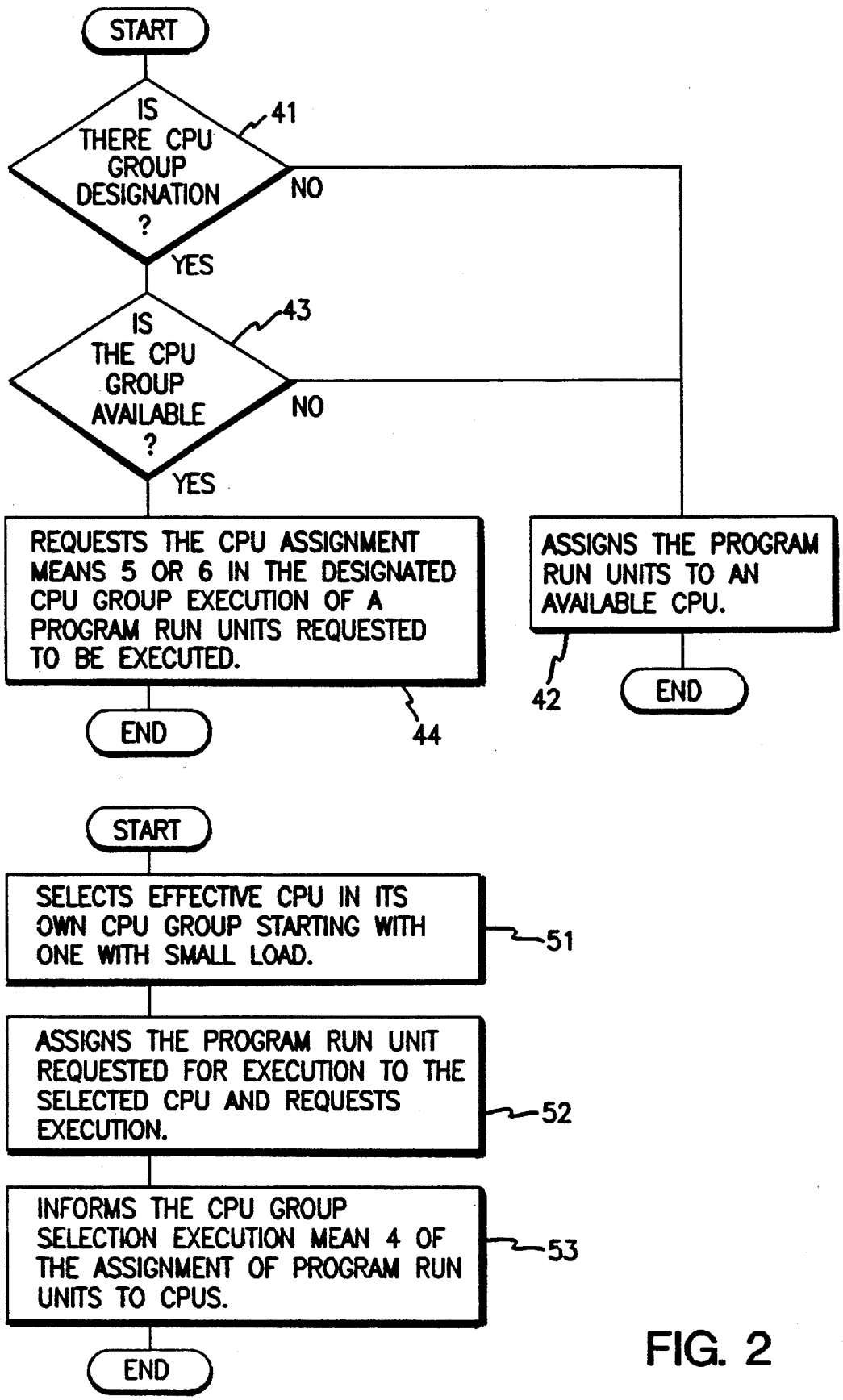
FIG. 2 shows flow charts for the processing of a CPU group selection execution means 4 and a CPU assignment means 5 in an embodiment of the invention.

When such a notification exists, the CPU group selection execution means 4 selects an arbitrary CPU group according to the method described in connection with the processing step 42 in FIG. 2, that is, by taking all the CPU groups 2 and 3 as the assignment object of the execution request and requests the CPU assignment means 5 or 6 of the selected CPU group to execute the program run unit for which an execution request was placed. Note, however, that when the CPU group 2 was blocked due to blockage of all the CPUs of the CPU group 2 because of the fault of the CPU 9, the CPU group 2 is excluded, needless to say, from the assignment object.

Figure 6:
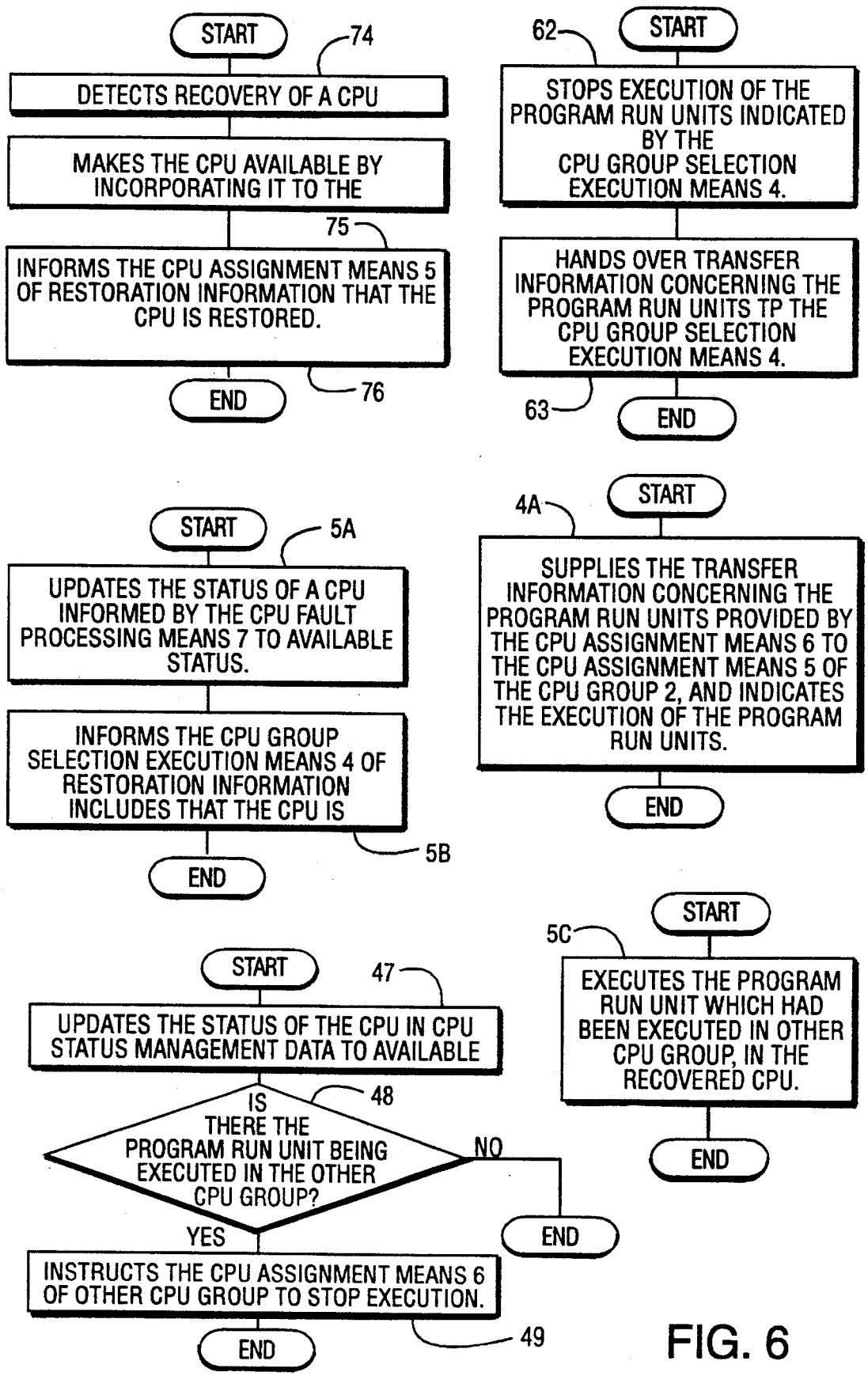
FIG. 6 shows flow charts depicting the steps taken when a faulty CPU is reinstated to normalcy by maintenance or the like according to an embodiment of the invention.

Next, operation of this embodiment when a faulty CPU is reinstated to normalcy by maintenance or the like will be described with reference to FIG. 6.

When a faulty CPU 9, for example, is corrected by maintenance or the like, the CPU fault processing means 7 detects this recovery (step 74). Upon detection of recovery of CPU 9 the CPU fault processing means 7 incorporates CPU 9 into the system to make it available (step 74) and then provides the CPU assignment means 5 with restoration information indicating the recovery of CPU 9 (step 76).

The CPU assignment means 5 internally changes the status of CPU 9 from being under blockage to the available status (step 5A) and thereafter incorporates CPU 9 in the assignment object for programs or tasks. At the same time, it provides the CPU group selection execution means 4 with restoration information which includes a message of restoration of CPU 9 (step 5B).

Upon receipt of the restoration information from the CPU assignment means 5 which includes a message that CPU 9 was recovered, the CPU selection execution means 4 changes the status of CPU 9 in the CPU status management data from being under blockage to the available status (step 47). In addition, the CPU group selection execution means 4 examines, when the CPU group 2 is recovered through recovery of CPU 9, whether there exists a program run unit which has been executed in another CPU group, for example, in the CPU group 3, in spite of the program run unit being one which originally designated the CPU group 2, by referring to the task execution status management data inside the means 4 and shown in FIG. 3 (step 48). If any existed, the means 4 instructs the CPU assignment means 6 of the CPU group 3 to stop the execution of all or a part of the program run units (step 49).

The CPU assignment means 6 stops the execution of program run units indicated by the CPU group selection execution means 4 (step 62) and hands over transfer information concerning the program run units to the CPU group selection execution means 4 (step 63).

The CPU group selection execution means 4 supplies the transfer information concerning the program run units provided by the CPU assignment means 6 to the CPU assignment means 5 of the CPU group 2 and indicates the execution of these program run units (step 4A).

The CPU assignment means 5 which was directed by the CPU assignment means 5 to execute the program run unit continues the execution of the program run unit, which designated its own CPU group but was under execution in another CPU group, by using the recovered CPU 9 (step 5C).

Figure 7:
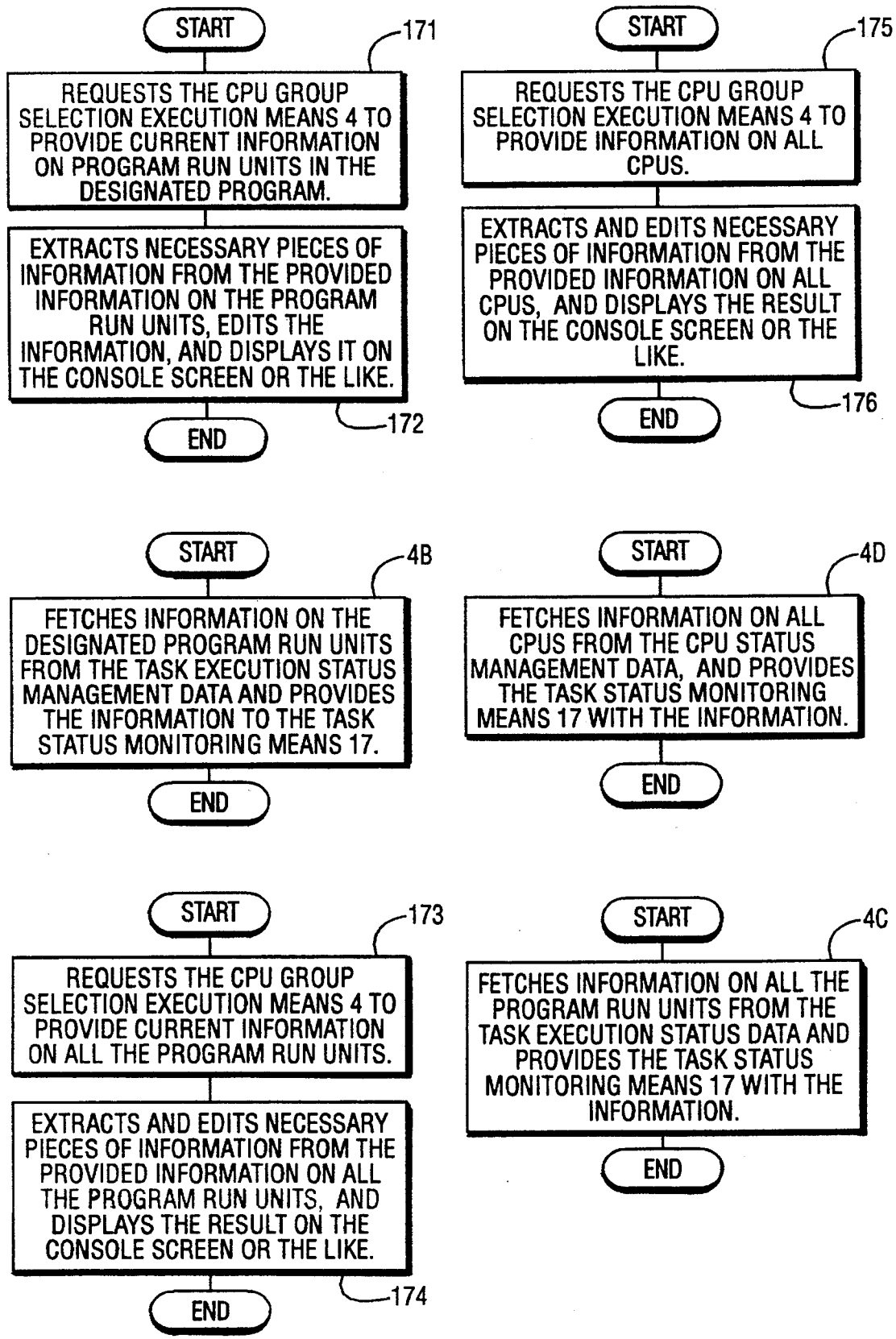
FIG. 7 shows flow charts for the processing of a task status monitoring means 17 and the CPU group selection execution means 4 in an embodiment of the invention.

Next, the task status monitoring means 17 and the execution result output means 18 shown in FIG. 1 will be described with reference to FIG. 7.

The task status monitoring means 17 has functions which display various kinds of status on a console screen or the like activated by an operator command or the like from a console (not shown). In this embodiment it provides the following three display functions:

(1) specific program display;

(2) program list display;

(3) CPU list display.

In the specific program display (1), in response to a specific program display request command which designates a program, it displays the CPU group designation designated by the program preparation means 16 or the like, the name of the CPU group currently assigned, or the like, for program run units of the designated program.

At the time of introduction of a specific program display request command, the task status monitoring means 17 requests the CPU group selection execution means 4 to provide current information on program run units in the designated program (step 171).

The CPU group selection execution means 4 fetches information on the designated program run units from the task execution status management data and provides the information to the task status monitoring means 17 (step 4B).

The task status monitoring means 17 extracts necessary pieces of information from the provided information on the program run units, edits the information and displays it on the console screen or the like (step 172).

As described above, in this embodiment, when a fault occurs in a CPU before execution of a program run unit with CPU group designation, and there is no longer found an available CPU in the designated CPU group, the CPU group selection execution means 4 requests another CPU group to execute the program run unit by disregarding the designated CPU group, so that it is not necessarily guaranteed that a program run unit with CPU group designation is executed in the designated CPU group. For this reason, there may arise a case in which the requester of a program in question wishes to monitor whether the program is actually executed in the designated CPU group and the specific program display function is provided to meet such a need.

The program list display (2), in response to a program list display request command, displays the name of the executing CPU group and the name of the executing CPU, or the like for every program run unit under execution in the computer system 1.

At the time of introduction of a program list display request command, the task status monitoring means 17 requests the CPU group selection execution means 4 to provide current information on all the program run units (step 173).

The CPU selection execution means 4 fetches information on all the program run units from the task execution status data and provides the task status monitoring means 17 with the information (step 4C).

The task status monitoring means 17 extracts and edits necessary pieces of information from the provided information on all the program run units and displays the result on the console screen or the like (step 174).

By virtue of such a program list display it is possible to readily investigate in real time knowledge about each CPU of a CPU group in which each program run unit is currently under execution. This fact can be used to enhance the user's operating efficiency of the computer system.

In the CPU list display (3), in response to a CPU list display request command, information on the name, number, or the like of the task under execution in every CPU in every CPU group of the computer system 1 is displayed by CPU group and by CPU.

At the time of introduction of a CPU list display request command, the task status monitoring means 17 requests the CPU group selection execution means 4 to provide information on all CPUs (step 175).

The CPU group selection execution means 4 fetches information on all CPUs from the CPU status management data and provides the task status monitoring means 17 with the information (step 4D).

The task status monitoring means 17 extracts and edits necessary pieces of information from the provided information on all CPUs and displays the result on the console screen or the like (step 176).

As described above, in this embodiment, there are cases in which execution of program run units is done in CPU groups that are different from those that were originally intended because of faults or the like in CPUs and in such a case it is conceivable that program run units are concentrated on specific CPU groups. Under these circumstances, it is useful to make it possible for the user to confirm the load conditions for every CPU group and for every CPU to enhance the user's operating efficiency of the computer system, by providing a CPU list display of the kind described above.

The task status monitoring means 17 has a function of setting, releasing or modifying the designation CPU group of a program run unit by means of an operator command or the like from a console which is not shown.

Figure 8B:
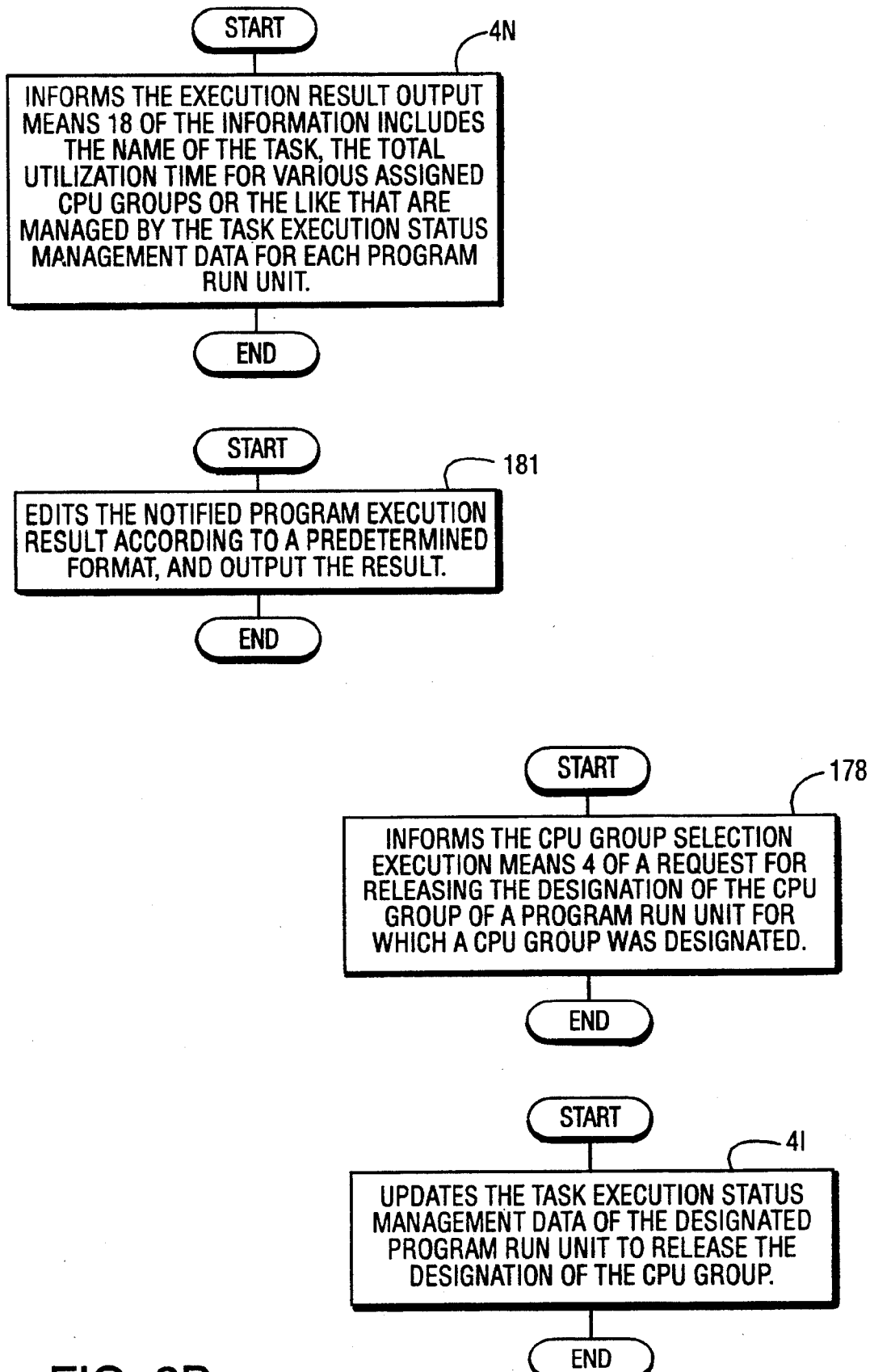

With reference to FIG. 8, if a setting request is issued by an operator command from the console or the like to designate a certain CPU group for a program run unit which did not designate a CPU group at the start of execution, the task status monitoring means 17 informs that to the CPU group selection execution means 4 (step 177).

The CPU group selection execution means 4 updates the task status management data of the designated program run unit by the designated CPU group (step 4E), judges whether the currently executing CPU group is different from the designated CPU group (step 4F), and, if different, stops the processing of the designated program run unit in the currently executing CPU group (step 4G) and carries out a control to continue execution in the designated CPU group (step 4H).

In addition, if a request is issued by an operator command from the console or the like to release the designation of the CPU group regarding a program run unit for which a CPU group was designated at the start of execution, the task status monitoring means 17 informs the message to the CPU group selection execution means 4 (step 178).

The CPU group selection execution means 4 updates the task execution status management data of the designated program run unit, to release the designation of the CPU group (step 4I).

Furthermore, if a modification request to designate a different CPU group is issued by an operator command from the console or the like regarding a program run unit which designated a certain CPU group at the start of execution, the task status monitoring means 17 informs the message to the CPU group selection execution means 4 (step 179).

The CPU group selection execution means 4 updates the task execution status management data of the designated program run unit in the designated CPU group (step 4J), judges whether the currently executing CPU group is different from the designated CPU group (step 4K) and, if different, stops the processing of the designated program run unit in the currently executing CPU group (step 4L) and gives a control to have the run unit executed continuously in the designated CPU group (step 4M).

By the use of setting, releasing or modification of the CPU group as described above, it is possible to enhance the operating efficiency of the computer system by distributing the load on the CPU groups, if needed, in compliance with then load conditions of the CPU groups confirmed by the aforementioned CPU list or the like.

Next, the execution result output means 18 is a means which outputs at the completion of the program, the CPU groups utilized by the program, utilization times, or the like as a part of an execution report for the program.

At the completion of execution of all the program run units constituting a certain program, the CPU program selection execution means 4 informs the execution result output means 18 information which includes the name of the task, the total utilization time for various assigned CPU groups, or the like that are managed by the task execution status management data for each program run unit (step 4N).

The execution result output means 18 edits the notified information on program execution result according to a predetermined format and outputs the result (step 181).

Using information output in this way, the user can grasp the name of the CPU group and the execution time spent there for each program run unit of the program and can grasp the task name that utilized the CPU, utilization time, or the like for each CPU group for each program by referring to the information. Accordingly, operating status such as the throughput of the computer system can be confirmed, and the result can be used to enhance the operating efficiency of the computer system.

As described above, when a plurality of CPUs having the same instruction configuration, though different in the instruction property, are classified by instruction property to form a set of CPU groups each consisting of CPUs with the same instruction property, a feature of this invention is that it comprises CPU assignment means existing in each CPU group which assigns program run units requested to be executed to CPU groups constituting its own CPU group, CPU group selection execution means which request, in executing the program, the CPU assignment means of speci- fied CPU groups for those program run units which designated specific CPU groups for execution and requests the CPU assignment means of arbitrary CPU groups for the execution of those run units which did not designate specific CPU groups and program execution indication means which gives additionally the CPU group designation concerning the program run units, at the time of giving indication as regards the program execution to the CPU group selection execution means.

It is another feature of the invention that it comprises CPU fault processing means existing in each CPU group which blocks faulty CPUs by detecting fault of individual CPUs included in its own CPU group, and informs the CPU assignment means of its own CPU group fault information which includes information on program run units under execution in the faulty CPUs, CPU assignment means which, by receiving fault information from the CPU fault processing means of its own CPU group, indicates continued execution of program run unit in a normal CPU of its own CPU group if the program run unit under execution in the faulty CPU is one which designated execution in its own CPU group and informs the CPU group selection execution means about the fault information if it is a program run unit which did not designate its own CPU group and CPU group selection execution means which by receiving the fault information from the CPU assignment means, selects the CPU assignment means of an arbitrary CPU group and indicates the selected CPU assignment means to continue execution of the program run unit which had been executed in the faulty CPU.

It is still another feature of the invention that it comprises execution result output means which receives, at the completion of program run units constituting a program, execution information which includes information on utilized CPU group and utilization time, or the like for each completed program run unit, edits the information and outputs the result as a part of execution report of the program, and task status monitoring means which receives from the CPU group selection execution means, in response to input of a program list display request, execution information which includes utilized CPU group and utilization time, or the like for every program run unit under execution.

As a result of these features, this invention has the following effects.

According to the configuration of the first embodiment, it is possible to execute at high speed programs with different properties or a program made up of a plurality of program run units with different properties, on CPUs suitable for the properties of respective programs or program run units by the use of one computer system, and in doing so, every program may be described according to the same instruction configuration. Therefore, an arbitrary program can be executed by any one of the CPUs.

According to the configuration of the second embodiment, the user can designate a CPU group related to a program separately from the program to be executed.

According to the configuration of the third embodiment, the user can designate a CPU group for each program run unit at the time of program preparation using program preparation means such as compilers and linkers.

According to the configuration of the fourth embodiment, setting, releasing or modification of the CPU group can be made even after request for program execution.

According to the configuration of the sixth and seventh embodiments, CPU group utilized, utilization time, or the like for every program run unit of the executed program can be obtained as a part of execution report of the program, the user can confirm the operation status such as the throughput of the computer system and utilize the information for enhancing the operating efficiency of the computer system.

According to the configuration of the eighth and ninth embodiments, the user can confirm such pieces of information as the utilized CPU group and utilized CPU for every program run unit currently under execution, which is useful for enhancing the operation efficiency of the computer system.

According to the configuration of the tenth and eleventh embodiments, it is possible to confirm in real time information on program run units under execution in every CPU of every CPU group, so that it is possible to monitor the load status for every CPU group of every CPU, and utilize the information for efficient operation of the computer system due to modification or the like based on the result of the monitoring.

According to the configuration of the twelfth and thirteenth embodiments, it is possible to carry out continued execution of a program run unit which had been under execution in a faulty CPU, in another normal CPU in the CPU group designated by the program run unit and to continue execution in an arbitrary CPU group by considering the CPU load balance without sticking to the framework of the CPU group.

According to the configuration of the 14th and 15th embodiments, even when all CPUs in a CPU group became unavailable due to fault or the like, it is possible to continue execution in another CPU group, though high speed execution is hampered to some extent, without abnormally terminating the processing of the program run unit that designated the CPU group in which the execution had been going on.

According to the configuration of the 16th and 17th embodiments, even when all CPUs in a CPU group became unavailable due to fault or the like, it is possible to execute a new program run unit which requests to be executed by that CPU group, though high speed execution is hampered to some extent.

According to the configuration of the 30th through 33rd embodiments, it is possible after CPU fault restoration to continue execution, in the CPU of the CPU group as designated, of a program run unit, whose execution was forced to be done in another CPU group due to CPU fault or the like in spite of the fact that the run unit originally designated the CPU group which includes the faulty CPU, thereby enabling execution at high speed accordingly.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A control unit for a computer system comprising a plurality of CPUs having a same instruction configuration and different instruction properties, said control unit comprising:

a plurality of CPU assignment means for classifying said plurality of CPUs into a plurality of CPU groups, each CPU group of said plurality of CPU groups comprising CPUs having a same instruction property, said CPU assignment means also causing a plurality of program run units requested to be executed in a designated CPU group to be executed in CPUs within said designated CPU group;

CPU group selection execution means for requesting, at a time of program execution, said CPU assignment means to carry out execution of said program run units requested to be executed by said designated CPU group, and for assigning said plurality of program run units which have not been designated to any CPU group to one of said plurality of CPU assignment means of an arbitrary CPU group for execution;

program execution indication means for additionally designating selected CPU groups to execute said plurality of program run units, upon indicating program execution to said CPU group selection execution means;

wherein said program execution indication means designates one of said plurality of CPU groups to said CPU group selection execution means based on a CPU group designation input separately from a program to be executed;

CPU fault processing means incorporated in each of said plurality of CPU groups for isolating faulty CPUs by detecting faults of individual CPUs included in its own CPU group, and for informing said CPU assignment means of its own CPU group of fault information including information concerning program run units under execution in the faulty CPUs, wherein said CPU assignment means, by receiving said fault information from said CPU fault processing means of its own CPU group, assigns to non-faulty CPUs of its own CPU group the continued execution of program run units if the program run units under execution in said faulty CPUs are those designated execution in its own CPU group, and informs said CPU group selection execution means of said fault information if the program run units did not designate its own CPU group, and said CPU group selection execution means, by receiving said fault information from said CPU assignment means, selects said CPU assignment means of an arbitrary one of said plurality of CPU groups, and instructs the selected CPU assignment means to continue execution of the program run units which had been under execution in said faulty CPUs; and execution result output means for receiving from said CPU group selection execution means, at a completion of execution of said program run units constituting the program, execution information including at least a CPU group utilized, and a utilization time for each completed program run unit, for editing the execution information and outputting said edited execution information as a part of an execution report for the program.

2. The control unit as claimed in claim 1, further comprising task status monitoring means for requesting said CPU group selection execution means to set, release or modify CPU groups for the requested program run units in response to a request for the setting, releasing or modification of said designated CPU groups, wherein said CPU group selection execution means carries out one of a CPU group setting operation, a CPU group releasing operation, and a CPU group modification operation of the program run units under execution in compliance with a request from said task status monitoring means.

3. The control unit as claimed in claim 1, further comprising task status monitoring means for receiving from said CPU group selection execution means execution information which includes at least a CPU group utilized, a CPU utilized for every program run unit under execution, and, in response to a request for program list display, for editing the execution information and displaying said edited execution information.

4. The control unit as claimed in claim 1, further comprising task status monitoring means for receiving from said CPU group selection execution means execution information including at least information concerning program run units under execution in every CPU in every CPU group, and, in response to a request for CPU list display, editing the information and displaying the edited execution information.

5. The control unit as claimed in claim 1, wherein said CPU assignment means informs said CPU group selection execution means of fault information generated by said CPU fault processing means when it is not possible to continue within its own CPU group the execution of the program run unit which designated its own CPU group, due to a lack of non-faulty CPUs in its own CPU group, and said CPU group selection execution means prevents CPU groups which do not contain any non-faulty CPUs from being selected, and instructs said CPU assignment means of another one of said plurality of CPU groups to continue execution of the program run units which had been under execution in the faulty CPUS listed in the fault information received from the CPU group by disregarding the designation of the CPU group.

6. The control unit as claimed in claim 5, wherein said CPU selection execution means instructs, when a request is issued from said program execution indication means for execution of the program run units designating a CPU group excluded from the selection object due to lack of non-faulty CPUs, said CPU assignment means to assign to another one of said plurality of CPU groups an execution of the program run unit by disregarding the designation of the CPU group.

7. The control unit as claimed in claim 5, further comprising task status monitoring means for receiving information including at least a CPU group designation information concerning the requested program, and an executing group information from said CPU group selection execution means, and, in response to a request for program display, editing the information and displaying the edited information.

8. The control unit as claimed in claim 5, further comprising task status monitoring means for receiving execution information including at least a CPU group utilized, and a CPU utilized information for every program run unit under execution from said CPU group selection execution means, and, in response to a request for program list display, editing the information and displaying the edited information.

9. The control unit as claimed in claim 5, wherein said CPU fault processing means incorporates CPUs that have been restored to non-faulty status into its own CPU group in order to make said restored CPUs available, and informs said CPU assignment means within its own CPU group of a restoration information, said CPU assignment means makes available the restored CPUs listed in the restoration information generated by said CPU fault processing means within its own CPU group, and informs said CPU group selection execution means of the restoration information, and said CPU group selection execution means receives said restoration information from said CPU assignment means, instructs the CPU assignment means to stop the execution of one of all and a part of the program run units being executed in other CPU groups in spite of their being program run units that designated execution in the CPU groups which received the restoration information, and directs said CPU assignment means of the CPU group which received said restoration information to continue execution of the program run units whose operation was stopped in compliance with the information.

10. The control unit as claimed in claim 6, further comprising task status monitoring means for receiving information including at least a CPU group designation information concerning the requested program, and an executing CPU group information from said CPU group selection execution means, and, in response to a request for program display, editing the information and displaying the edited information.

11. The control unit as claimed in claim 6, further comprising task status monitoring means for receiving execution information including at least a CPU group utilized, and a CPU utilized information for every program run unit under execution from said CPU group selection execution means, and, in response to a request for program list display, editing the information and displaying the edited information.

12. The control unit as claimed in claim 6, wherein said CPU fault processing means incorporates the CPUs that have been restored to non-faulty status into its own CPU group in order to make said restored CPUs available, and informs said CPU assignment means of its own CPU group of the restoration information, said CPU assignment means the restored CPUs listed in the restoration information generated by said CPU fault processing means of its own CPU group, and informs said CPU group selection execution means of the restoration information, and said CPU group selection execution means receives said restoration information from said CPU assignment means, instructs the CPU assignment means to stop the execution of one of all and a part of the program run units being executed in other CPU groups in spite of their being program run units that designated execution in the CPU groups which received the restoration information, and directs said CPU assignment means of the CPU group which received said restoration information to continue execution of the program run units whose operation was stopped in compliance with the information.

13. The control unit as claimed in claim 8, wherein said task status monitoring means requests said CPU group selection execution means to set, release or modify CPU groups for the requested program run units under execution, in response to a request for setting, releasing or modification of said designated CPU groups, and said CPU group selection execution means carries out one of a CPU group setting operation, a CPU group releasing operation, and a CPU group modification operation of the program run units under execution in compliance with a request from said task status monitoring means.

14. The control unit as claimed in claim 11, wherein said task status monitoring means requests said CPU group selection execution means to set, release or modify CPU groups for the requested program run units under execution, in response to a request for setting, releasing or modification of said designated CPU groups, and said CPU group selection execution means carries out one of a CPU group setting operation, a CPU group releasing operation, and a CPU group modification operation of the program run units under execution in compliance with a request from said task status monitoring means.

15. A control unit for a computer system comprising a plurality of CPUs having a same instruction configuration and different instruction properties, said control unit comprising:

a plurality of CPU assignment means for classifying said plurality of CPUs into a plurality of CPU groups, each CPU group of said plurality of CPU groups comprising CPUs having a same instruction property, said CPU assignment means also causing a plurality of program run units requested to be executed in a designated CPU group to be executed in CPUs within said designated CPU group;

CPU group selection execution means for requesting, at a time of program execution, said CPU assignment means to carry out execution of said program run units requested to be executed by said designated CPU group, and for assigning said plurality of program run units which have not been designated to any CPU group to one of said plurality of CPU assignment means of an arbitrary CPU group for execution;

program execution indication means for additionally designating selected CPU groups to execute said plurality of program run units, upon indicating program execution to said CPU group selection execution means;

wherein said program execution indication means designates one of said plurality of CPU groups to said CPU group selection execution means based on a CPU group designation described in a program to be executed;

CPU fault processing means incorporated in each of said plurality of CPU groups for isolating faulty CPUs by detecting fault of individual CPUs included in its own CPU group, and informing said CPU assignment means of its own CPU group about fault information which includes pieces of information concerning program run units under execution in the faulty CPUs, wherein said CPU assignment means, by receiving said fault information from said CPU fault processing means of its own CPU group, assigns to non-faulty CPUs of its own CPU group the continued execution of program run units if the program run units under execution in said faulty CPUs are those designated execution in its own CPU group, and informs said CPU group selection execution means about said fault information if the program run units did not designate its own CPU group, and said CPU group selection execution means, by receiving said fault information from said CPU assignment means, selects said CPU assignment means of an arbitrary one of said plurality of CPU groups, and instructs the selected CPU assignment means to continue execution of the program run units which had been under execution in said faulty CPUs, execution result output means for receiving from said CPU group selection execution means, at a completion of execution of said program run units constituting the program, execution information including at least a CPU group utilized, and a utilization time for each completed program run unit, for editing the execution information and outputting said edited execution information as a part of an execution report for the program.

16. The control unit as claimed in claim 15, further comprising task status monitoring means for requesting said CPU group selection execution means to set, release or modify CPU groups for the requested program run units in response to a request for the setting, releasing or modification of said designated CPU groups, wherein said CPU group selection execution means carries out one of a CPU group setting operation, a CPU group releasing operation, and a CPU group modification operation of the program run units under execution in compliance with a request from said task status monitoring means.

17. The control unit as claimed in claim 15, further comprising task status monitoring means for receiving from said CPU group selection execution means execution information which includes at least a CPU group utilized, a CPU utilized for every program run unit under execution, and, in response to a request for program list display, editing the execution information and displaying the edited execution information.

18. The control unit as claimed in claim 15, further comprising task status monitoring means for receiving from said CPU group selection execution means execution information including at least information concerning program run units under execution in every CPU in every CPU group, and, in response to a request for CPU list display, editing the execution information and displaying the edited execution information.

19. The control unit as claimed in claim 15, wherein said CPU assignment means informs said CPU group selection execution means of fault information generated by said CPU fault processing means when it is not possible to continue within its own CPU group the execution of the program run unit which designated its own CPU group due to a lack of non-faulty CPUs in its own CPU group, and said CPU group selection execution means prevents CPU groups which do not contain any non-faulty CPUs from being selected, and instructs said CPU assignment means of another one of said plurality of CPU groups to continue execution of the program run units which had been under execution in the faulty CPUs listed in the fault information received from the CPU group by disregarding the designation of the CPU group.

20. The control unit as claimed in claim 19, wherein said CPU selection execution means instructs, when a request is issued from said program execution indication means for execution of the program run units designating a CPU group excluded from the selection object due to lack of non-faulty CPUs, said CPU assignment means to assign to another of said plurality of CPU groups an execution of the program run unit by disregarding the designation of the CPU group.

21. The control unit as claimed in claim 19, further comprising task status monitoring means for receiving information including at least a CPU group designation information concerning the requested program, and an executing group information from said CPU group selection execution means, and, in response to a request for program display, editing the information and displaying the edited information.

22. The control unit as claimed in claim 19, further comprising task status monitoring means for receiving execution information including at least a CPU group utilized, and a CPU utilized information for every program run unit under execution from said CPU group selection execution means, and, in response to a request for program list display, editing the information and displaying the edited information.

23. The control unit as claimed in claim 19, wherein said CPU fault processing means incorporates CPUs that have been restored to non-faulty status into its own CPU group in order to make said restored CPUs available, and informs said CPU assignment means within its own CPU group of the restoration information, said CPU assignment means makes available the restored CPUs listed in the restoration information generated by said CPU fault processing means of its own CPU group, and informs said CPU group selection execution means of the restoration information, and said CPU group selection execution means receives said restoration information from said CPU assignment means, instructs the CPU assignment means to stop the execution of one of all and a part of the program run units being executed in other CPU groups in spite of their being program run units that designated execution in the CPU groups which received the restoration information, and directs said CPU assignment means of the CPU group which received said restoration information to continue execution of the program run units whose operation was stopped in compliance with the information.

24. The control unit as claimed in claim 20, further comprising task status monitoring means for receiving information including at least a CPU group designation information concerning the requested program, and an executing CPU group information from said CPU group selection execution means, in response to a request for program display, editing the information and displaying the edited information.

25. The control unit as claimed in claim 20, further comprising task status monitoring means for receiving execution information including at least a CPU group utilized, and a CPU utilized information for every program run unit under execution from said CPU group selection execution means, and, in response to a request for program list display, editing the information and displaying the edited information.

26. The control unit as claimed in claim 20, wherein said CPU fault processing means incorporates CPUs that have been restored to non-faulty status into its own CPU group in order to make said restored CPUs available, and informs said CPU assignment means of its own CPU group of the restoration information, said CPU assignment means makes available the restored CPUs listed in the restoration information generated by said CPU fault processing means of its own CPU group, and informs said CPU group selection execution means of the restoration information and, said CPU group selection execution means receives said restoration information from said CPU assignment means, instructs the CPU assignment means to stop the execution of one of all a part of the program run units being executed in other CPU groups in spite of their being program run units that designated execution in the CPU groups which received the restoration information, and directs said CPU assignment means of the CPU group which received said restoration information to continue execution of the program run units whose execution was stopped in compliance with the information.

27. The control unit as claimed in claim 22, wherein said task status monitoring means requests said CPU group selection execution means to set, release or modify CPU groups for the requested program run units under execution, in response to a request for setting, releasing or modification of said designated CPU groups, and said CPU group selection execution means carries out one of a CPU group setting operation, a CPU group releasing operation, and a CPU group modification operation of the program run units under execution in compliance with a request from said task status monitoring means.

28. The control unit as claimed in claim 25, wherein said task status monitoring means requests said CPU group selection execution means to set, release or modify CPU groups for the requested program run units under execution, in response to a request for setting, releasing or modification of said designated CPU groups, and said CPU group selection execution means carries out one of CPU group setting operation, a CPU group releasing operation, and a CPU group modification operation of the program run units under execution in compliance with a request from said task status monitoring means.

* * * * *